United States Patent
Brueck et al.

(10) Patent No.: US 9,578,354 B2
(45) Date of Patent: Feb. 21, 2017

(54) DECOUPLED SLICING AND ENCODING OF MEDIA CONTENT

(75) Inventors: David F. Brueck, Saratoga Springs, UT (US); C. Ryan Owen, Riverton, UT (US); Tyler Bye, Lehi, UT (US); Nathan J. Edwards, Orem, UT (US); Ken Brueck, Lehi, UT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1183 days.

(21) Appl. No.: 13/448,213

(22) Filed: Apr. 16, 2012

(65) Prior Publication Data

US 2014/0247885 A1  Sep. 4, 2014

Related U.S. Application Data

(60) Provisional application No. 61/476,715, filed on Apr. 18, 2011.

(51) Int. Cl.
| | |
|---|---|
| *H04N 7/12* | (2006.01) |
| *H04N 21/237* | (2011.01) |
| *H04L 29/06* | (2006.01) |
| *H04N 21/2343* | (2011.01) |
| *H04N 21/61* | (2011.01) |
| *H04N 21/845* | (2011.01) |
| *H04L 29/08* | (2006.01) |

(52) U.S. Cl.
CPC ......... *H04N 21/237* (2013.01); *H04L 65/605* (2013.01); *H04L 65/80* (2013.01); *H04L 67/322* (2013.01); *H04N 21/23439* (2013.01); *H04N 21/234327* (2013.01); *H04N 21/6125* (2013.01); *H04N 21/8456* (2013.01); *H04L 65/607* (2013.01); *H04L 67/02* (2013.01)

(58) Field of Classification Search
None
See application file for complete search history.

(56) References Cited

U.S. PATENT DOCUMENTS

| | | |
|---|---|---|
| 4,535,355 A | 8/1985 | Arn et al. |
| 5,953,506 A | 9/1999 | Karla et al. |
| 6,091,775 A | 7/2000 | Hibi et al. |
| 6,091,777 A | 7/2000 | Guetz et al. |
| 6,195,680 B1 | 2/2001 | Goldszmidt et al. |
| 6,366,614 B1 | 4/2002 | Pian et al. |
| 6,389,473 B1 | 5/2002 | Carmel et al. |
| 6,486,803 B1 | 11/2002 | Luby et al. |
| 6,490,627 B1 | 12/2002 | Karla et al. |
| 6,510,553 B1 | 1/2003 | Hazara |
| 6,574,591 B1 | 6/2003 | Kleiman et al. |

(Continued)

FOREIGN PATENT DOCUMENTS

| | | |
|---|---|---|
| CA | 2466482 | 5/2003 |
| EP | 0711077 A2 | 5/1996 |

(Continued)

OTHER PUBLICATIONS

Wicker, Stephen B., "Error Control Systems for Digital Communication and Storage", Prentice-Hall, Inc., New Jersey, USA, 1995 (Book: see NPL's Parts 1-6).

(Continued)

*Primary Examiner* — Dakshesh Parikh

(57) ABSTRACT

A method and system for decoupling slicing and encoding of media content is described.

24 Claims, 8 Drawing Sheets

(56) References Cited

U.S. PATENT DOCUMENTS

| | | |
|---|---|---|
| 6,604,118 B2 | 8/2003 | Kleiman et al. |
| 6,731,600 B1 | 5/2004 | Patel et al. |
| 6,732,183 B1 | 5/2004 | Graham |
| 6,968,387 B2 | 11/2005 | Lanphear |
| 7,075,986 B2 | 7/2006 | Girod et al. |
| 7,096,271 B1 | 8/2006 | Omoigui et al. |
| 7,349,976 B1 | 3/2008 | Glaser et al. |
| 7,408,984 B2 | 8/2008 | Lu et al. |
| 2002/0073167 A1 | 6/2002 | Powell et al. |
| 2002/0144276 A1 | 10/2002 | Radford et al. |
| 2002/0174434 A1 | 11/2002 | Lee et al. |
| 2002/0188745 A1 | 12/2002 | Hughes et al. |
| 2003/0005455 A1 | 1/2003 | Bowers |
| 2003/0067872 A1 | 4/2003 | Harrell et al. |
| 2003/0081582 A1 | 5/2003 | Jain et al. |
| 2003/0107994 A1 | 6/2003 | Jacobs et al. |
| 2003/0135631 A1 | 7/2003 | Li et al. |
| 2003/0151753 A1 | 8/2003 | Li et al. |
| 2003/0152036 A1 | 8/2003 | Quigg Brown et al. |
| 2003/0204519 A1 | 10/2003 | Sirivara et al. |
| 2004/0003101 A1 | 1/2004 | Roth et al. |
| 2004/0030797 A1 | 2/2004 | Akinlar et al. |
| 2004/0031054 A1 | 2/2004 | Dankworth et al. |
| 2004/0054551 A1 | 3/2004 | Ausubel et al. |
| 2004/0071209 A1 | 4/2004 | Burg et al. |
| 2004/0093420 A1 | 5/2004 | Gamble |
| 2004/0143672 A1 | 7/2004 | Padmanabham et al. |
| 2004/0170392 A1 | 9/2004 | Lu et al. |
| 2005/0108414 A1 | 5/2005 | Taylor et al. |
| 2005/0123058 A1 | 6/2005 | Greenbaum et al. |
| 2006/0294128 A1* | 12/2006 | Gottschalk ........ G06F 17/30017 |
| 2007/0024705 A1 | 2/2007 | Richter et al. |
| 2008/0028428 A1 | 1/2008 | Jeong et al. |
| 2008/0056373 A1 | 3/2008 | Newlin et al. |
| 2008/0162713 A1* | 7/2008 | Bowra ............... H04N 21/4344 709/231 |
| 2008/0195744 A1 | 8/2008 | Bowra et al. |
| 2008/0195745 A1 | 8/2008 | Bowra et al. |
| 2010/0316126 A1* | 12/2010 | Chen .................... H04N 19/124 375/240.16 |
| 2012/0221741 A1* | 8/2012 | Frojdh ........... H04N 21/234318 709/231 |

FOREIGN PATENT DOCUMENTS

| | | |
|---|---|---|
| EP | 0919952 A1 | 6/1999 |
| EP | 1641271 A2 | 3/2006 |
| EP | 1670256 A2 | 6/2006 |
| EP | 1777969 A1 | 4/2007 |
| WO | 0067469 | 11/2000 |

OTHER PUBLICATIONS

On2 Technologies, Inc. "TrueMotion VP7 Video Codec", White Paper, Document Version 1.0, Jan. 10, 2005, (13 pages).
Intelligent Streaming, Bill Birney, May 2003, pp. 6 total.
Albanese, Andres, et al. "Priority Encoding Transmission", TR-94-039, Aug. 1994, 36 pages, International Computer Science Institute, Berkeley, California.
Puri, Rohit, et al. "Multiple Description Source Coding Using Forward Error Correction Codes", Oct. 1999, 5 pages, Department of Electrical Engineering and Computer Science, University of California, Berkeley, California.
Pathan, Al-Mukaddim, et al., "A Taxonomy and Survey of Content Delivery Networks", Australia, Feb. 2007. Available at http://www.gridbus.org/reports/CDN-Taxonomy.pdf.
Pantos, E.R. (Oct. 15, 2012). HTTP Live Streaming, download from http://tools.ietf.org/html/draft-pantos-http-live-streaming, 74 pages.

* cited by examiner

DECOUPLED SLICING AND ENCODING OF MEDIA CONTENT

RELATED APPLICATIONS

This application claims the benefit of U.S. Provisional Application No. 61/476,715, filed Apr. 18, 2011, the entire contents of which are incorporated herein by reference.

TECHNICAL FIELD

Embodiments of the present invention relate to the field of slicing and encoding of media content for delivery over a network. Specifically, the embodiments of the present invention relate to decoupling slicing and encoding for adaptive streaming of the source media content.

BACKGROUND

The Internet is becoming a primary method for distributing media content (e.g., video and audio or audio) and other information to end users. It is currently possible to download music, video, games, and other media information to computers, cell phones, and virtually any network capable device. The percentage of people accessing the Internet for media content is growing rapidly. The quality of the viewer experience is a key barrier to the growth of video viewing on-line. Consumer expectations for online video are set by their television and movie viewing experiences.

Audience numbers for streaming video on the web are rapidly growing, and there are a growing interest and demand for viewing video on the Internet. Streaming of data files or "streaming media" refers to technology that delivers sequential media content at a rate sufficient to present the media content to a user at the originally anticipated playback speed without significant interruption. Unlike downloaded data of a media file, streamed data may be stored in memory until the data is played back and then subsequently deleted after a specified amount of time has passed.

The process for preparing media content for adaptive streaming typically involves taking a source content file, such as a movie, or a source content feed (e.g., a broadcast signal), and splitting it into temporal chunks or slices, and encoding each slice at a different quality level. Typically, the different quality levels are achieved by encoding the source media content at different bit rates according to encoding profiles. During playback, and as network conditions fluctuate, a consuming application selects a slice at one of the different quality levels that is best suited for the present network throughput, and the consuming applications adjusts the quality up or down as available bandwidth increases or decreases by selecting subsequent slices at the appropriate quality levels.

Streaming media content over the Internet has some challenges, as compared to regular broadcasts over the air, satellite, or cable. Although the adaptive streaming approach provides many advantages, one major disadvantage is that each temporal slice must be encoded multiple times, often a dozen or more, depending on the desired number of quality levels and playback devices or platforms. Also, the computational resources required to encode into the multiple formats is often quite large, as is the necessary bandwidth required to move the encoded slices to their location on a web server from which they are served during playback.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
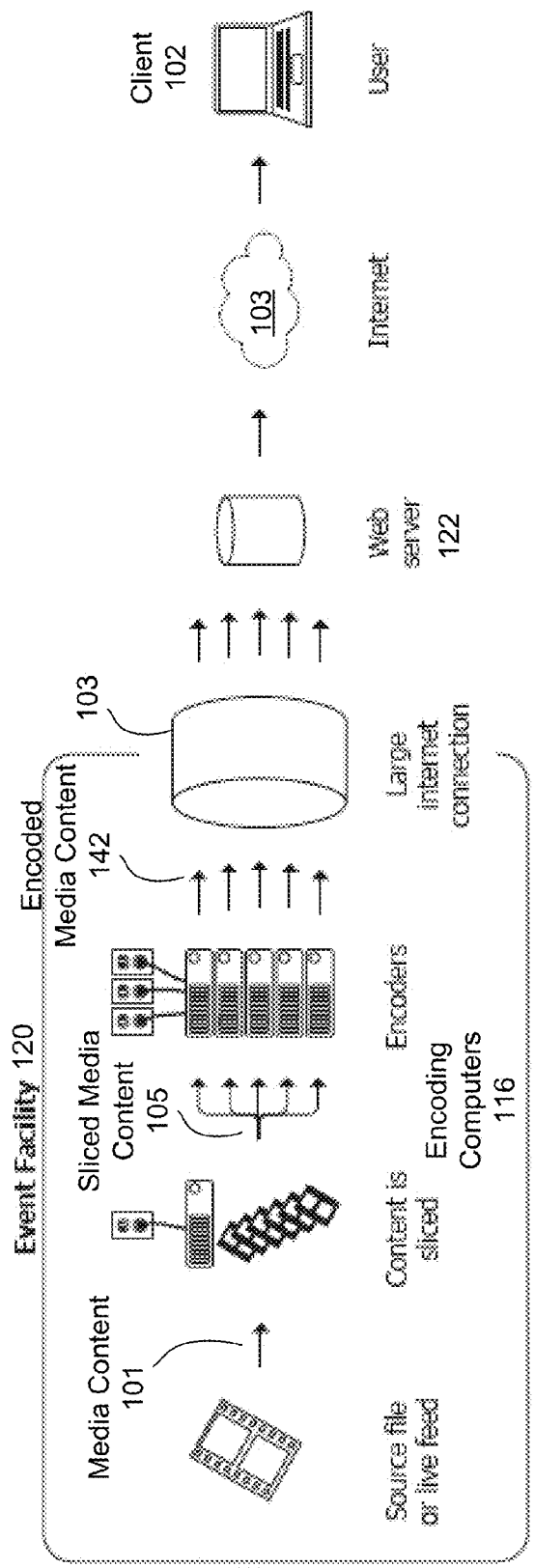
FIG. 1 illustrates one approach for adaptive streaming of media content of a live event.

A method and system for decoupling slicing and encoding of media content is described. In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "communicating," "capturing," "executing," "defining," "specifying," "creating," "recreating," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 illustrates one approach for adaptive streaming of media content of a live event. The source media content 101, which may be a signal or feed, is captured where the live event occurs, such as a football game in a stadium, for example. The live signal is captured, encoded, and delivered to a server such as a web server 122. From the web server 122, the encoded media content is downloaded via the Internet (network 103) to a user's client computer 102 for consumption. In one embodiment, the web server 122 uses adaptive streaming to deliver the encoded media content to the user's computer 102.

As described above, the process for preparing media content for adaptive streaming typically involves taking a source content file, such as a movie, or a source content feed, such as a broadcast signal, and splitting it into temporal chunks or slices, and encoding each slice at a different quality level. Typically, the different quality levels are achieved by encoding the source media content at different bit rates according to encoding profiles. During playback, and as network conditions fluctuate, a consuming application selects a slice at one of the different quality levels that is best suited for the present network throughput, and the consuming applications adjusts the quality up or down as available bandwidth increases or decreases by selecting subsequent slices at the appropriate quality levels. Similar techniques may be used for other conditions than network conditions, such as availability of computational resources.

In this approach of live adaptive streaming, the encoding resources (e.g., encoders 116) are moved to be on-site at the location of the event in an event facility 120, for example in a mobile production truck that is present at the stadium. The live signal is fed into encoding computers 116 at the live event. These encoding computers 116 divide the signal into temporal slices, referred to as sliced media content 105, encode the slices to the various bitrates as the encoded media content 142, and upload them to a remote web server 122. This approach has several drawbacks because of the cost and size of the encoder computers 116. Because of the need to encode each temporal slice multiple times, often many encoder computers 116 are required. Having them on-site at the event means that there needs to be a large amount of available space for the encoding computers 116, along with a substantial amount of electrical power, both of which are often infeasible at the event facility 120. Further, the aggregate bandwidth required to deliver all of the encoded slices to the remote web server can be quite large, something that is again often infeasible at an event facility. This is illustrated as the large internet connection to the network 103 to the web server 122.

Figure 2:
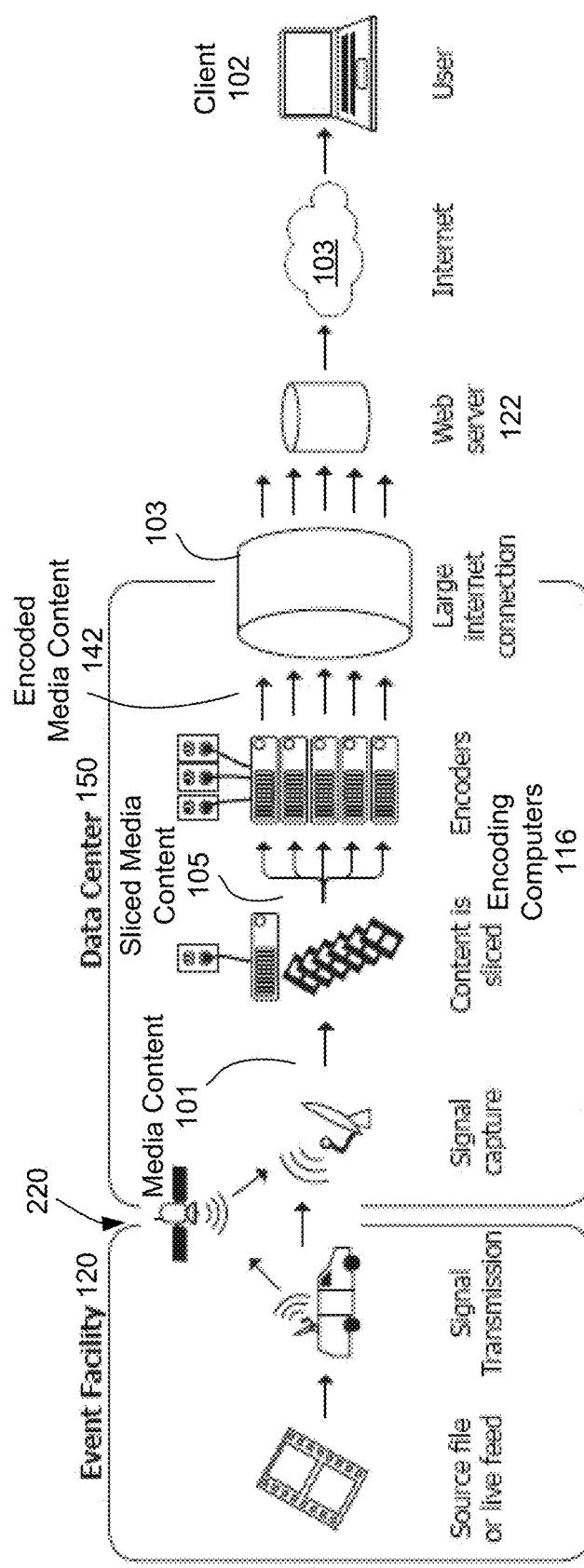
FIG. 2 illustrates another approach for adaptive streaming of media content of a live event.

FIG. 2 illustrates another approach for adaptive streaming of media content of a live event. Instead of moving the encoding resources 116 to the signal source (on-site at the live event's location at the event facility 120), in this approach the signal source of the source media content 101 is moved to the encoding resources 116. The live signal is captured at the event location 120 and then sent to a data center 150 via a delivery mechanism 220, such as a microwave or satellite uplink. The data center 150 has suitable computer hardware to receive the signal and to send the signal to encoding computers 116 that divide the signal into temporal slices, encode them to various bitrates, and upload them to a remote web server 122. The advantage of this approach relative to the former approach is that the power and space requirements of the encoding computers 116 are moved to the data center facility 150 rather than at the on-site event facility 120. For example, it is much easier to find suitable physical space, electricity, and network bandwidth in a data center 150 than at the live event's location 120. Unfortunately, this approach introduces some costly new disadvantages. In order to deliver the live signal from the event location 120 to the data center 150, specialized hardware must be introduced into the system. At the point of signal acquisition at the live event 120 there must be a transmitter and a corresponding receiver must exist at the data center 150. These solutions can be cost prohibitive, especially if the signal relay is performed via satellite. Further, the specialized receiving hardware must be installed and operated by the data center 150, which might not be feasible with many data centers.

Figure 3:
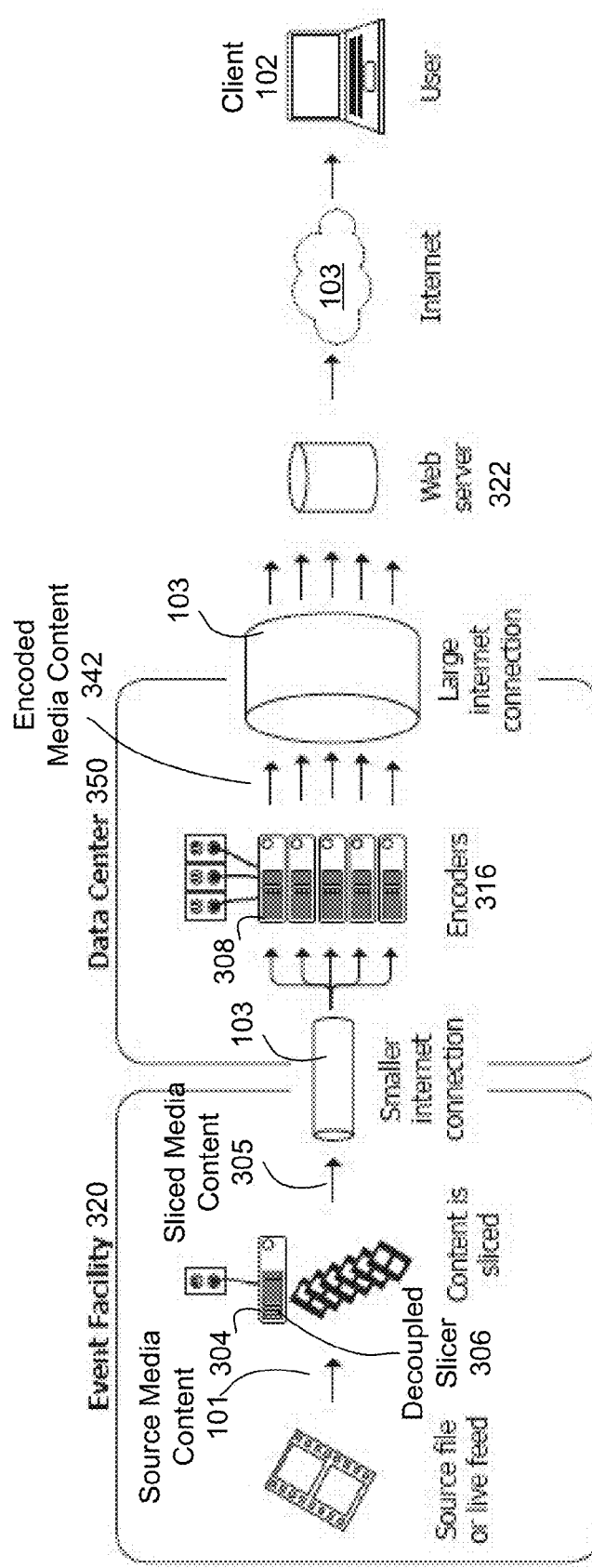
FIG. 3 illustrate one embodiment of an approach for decoupled slicing and encoding for adaptive streaming of media content of a live event.

The embodiments described herein provide an approach for adaptive streaming of media content of a live event (also referred to herein as live adaptive streaming). The embodiments described herein can also provide an approach for adaptive streaming of media content of a non-live streaming or video on-demand (VOD) streaming FIG. 3 illustrate one embodiment of an approach for adaptive streaming of media content of a live event. This approach may yield the advantages of the above two approaches but eliminates the costly disadvantages. This technique for adaptive streaming content preparation includes a decoupled slicer 306. In one embodiment, the decoupled slicer 306 may be a lightweight piece of software (called the "decoupled slicer 306") that runs on a computing system 304 near the signal source, such as a laptop computer at an event facility 320. The decoupled slicer 306 slices the source media content 101 into the temporal chunks (referred to herein as sliced media content 305 and temporal slices) and pushes each temporal slice to a remote server 322 in a data center facility 350. The source media content 101 may include data corresponding to video and/or audio corresponding to a television broadcast, sporting event, movie, music, concert, or the like. The source media content 101 may include uncompressed video and audio, or alternatively, uncompressed video or audio. Alternatively, the source media content 101 may include compressed content (e.g., video and/or audio) using standard or proprietary encoding schemes. The source media content 101 may be digital in form and may include media content having a high bit rate, such as, for example, 2 Mbps or greater. Encoders 116 in the data center 350 operate on individual slices. For example, the encoders 116 can download the slice, encode the slice to the multiple quality levels, and deliver the encoded slices to the destination server (e.g., an origin content server such as web server 322). The encoded slices are referred to herein as encoded media content 342. The web server 322 delivers the requested media content 342 over the network 103 to the client computing systems 102, as described herein. One key change to this approach is that the process of dividing a signal into temporal slices is decoupled from the process of encoding the slices to the various bitrates and delivering them to a web server 322.

Because the decoupled slicer 306 is not doing the process of encoding to the many output formats, it does not need large amounts of computing hardware to run, so there are not large space and electricity requirements at the live event facility 320; there only needs to exist sufficient computing hardware to capture the live signal and divide it into the temporal slices as described herein. It is feasible that this slicing could even be performed on a mobile device with a camera, such as the iPhone® device, the iPad® tablet, or the mobile devices. Alternatively, other types of portable or non-portable computing devices may be used to capture the source media, or receive the source media from another capture device, and slice the signal before sending to the data center 350 for encoding as would be appreciated by one of ordinary skill in the art having the benefit of this disclosure.

Because the decoupled slicer 306 acquires the signal and creates the temporal slices for delivery to the data center 350 over the Internet (e.g., network 103), a specialized delivery mechanism, like a microwave or satellite link, is not required. Instead, the slices can be delivered over a normal Internet connection because there is only a single slice per range of time rather than many versions of the slices encoded at the various bitrates.

In the data center facility 350, no specialized receiving hardware is required, because the slices from the signal are received over a standard internet connection. At the data center 350, the encoders 116 process the slices individually, create the encoded slices at the various bitrates, and deliver them to the destination web server 322.

This approach to live adaptive streaming can also be applied to file-based content preparation for adaptive streaming and similar benefits can be derived from its use. For file-based content, the source content file is typically uploaded to an intermediary location, such as an FTP server in a data center 350. Once the source content file is fully uploaded, it is available for download by an encoder 316. The encoder 316 downloads it, creates the temporal slices, encodes the slices to the various output bitrates, and uploads them to the destination web server. This technique has several disadvantages, the first being that the source content files are often very large, such that it can take a very long time to transfer them to an intermediary file server, so there is a long delay before encoding of the source content file can even begin. The large file size also makes it difficult to distribute the process of encoding the source content file among many computers because each one needs to download the source content file in order to process it.

As with live content preparation, one alternative approach is to move the encoding computers to the same location as the source content file as described above. As with live content preparation, however, this has the downsides of requiring space and electricity for expensive encoding hardware. Even if the encoding hardware is moved to the same physical location as the source content file, a file transfer is still usually required to move the source content file from the computer on which it was created (on a video producer's computer, for example) to a location where the encoding computers can access it. Using the embodiments described herein, these disadvantages may be avoided.

As before, the decoupled slicer 306 is run at the same location as the media source (e.g., location of a source content feed or signal). Instead of capturing a live signal, however, the decoupled slicer 306 uses a media file as its input. Because the decoupled slicer 306 does not require large computational resources, it can be run directly on the computer that contains the source media content file, so there is no need for a large file transfer to occur. As before, the temporal slices created by the decoupled slicer 306 can be delivered to a data center 350 for encoding. Decoupling the slicing from the encoding may enable the two parts of the process to happen in locations that are the most convenient and cost effective.

One side effect of slicing the source media content file is that the process of encoding can begin immediately; as soon as the first slice is delivered to the data center 350, it is available for processing by an encoder 316. With a suitable number of available encoders 316, it becomes feasible to have the content fully encoded soon after slicing finishes.

Proper slicing of source media for adaptive streaming may be achieved by analyzing the source media content to locate the individual video frames and audio data in order to create temporal chunks of video and audio. Three techniques for slicing media at the source are described below, including 1) overlapping source slices; 2) Fast, high bit rate encode during slicing; and 3) Simulated source slices.

Overlapping Source Slices

In this embodiment, the source media is read sequentially without decoding it (i.e. its container like MP4 is read but the encoded H.264 data isn't decoded to raw video pixels). Along the way, a record is kept of where independently decodable (key) frames occur in the source content file, and where audio block boundaries occur. For each desired temporal range, a slice file is created that includes all the audio and video data in that time range plus sufficient data before and after the time range so that the data in that time range can be decoded to raw audio and video by an encoder 316. An encoder 316 takes a slice of data, decodes it to raw audio and video, and then encodes it to the various output bitrates and quality levels.

For example, if the desired duration of a temporal slice is 10 seconds of audio and video data, the first video frame in that range of time may be a delta frame (one that requires access to an earlier frame in order to be decoded). The necessary key frame may fall at 9.7 seconds in the video. Similarly, the last desired video frame in the time range may occur at 19.95 seconds, and may be a B-frame that depends on a future frame to be fully decoded. This dependent frame could occur at 20.2 seconds in the video. Because of this, the temporal slice file for the range of time from 10-20 seconds would actually be created to cover the time range 9.7-20.2, so that all the necessary video frames could be decoded by an encoder 316 that does not have access to the full, original media source. The encoder 316 would download the slice file, decode it to raw audio and video, and then discard the video frames that fall outside the 10-20 time range.

A similar process may be used to ensure that the necessary audio for the desired range can be decoded to raw audio samples. For example, the decoupled slicer 306 would include enough audio to completely decode the audio in the desired range, and the encoder 316 would decode it to raw audio samples and then discard any excess audio samples before or after the desired time range.

The decoupled slicer 306 would encode in the temporal slices information the encoders 316 would use to know how much audio and video to discard.

A primary benefit of this approach may be that the process of reading the source media without decoding it is very efficient relative to actually decoding the source media, and content that is already compressed would remain compressed with no additional work. A downside may be a decrease in transport efficiency. In order to include sufficient audio and video samples, the source slices necessarily overlap temporally. The degree of overlap (how many extra audio and video samples must be included) varies by codec and by the settings used to originally encode the source content file, such as the key frame interval and the degree of audio/video interleaving.

Fast, High Bit Rate Encode During Slicing

In this embodiment, the source media is read and decoded to raw audio and video samples. Because the source media is decoded to raw data, the decoupled slicer 306 can create source slices that specifically cover the desired temporal range. However, once the data has been decoded, it is prohibitively large, and may be too large to upload to a remote server. So, in one embodiment, the data is re-compressed using a fast encode scheme, making the slices small enough to transfer to a remote server. For example, a single-pass H.264 encoding could be used with settings that make the encoding process occur quickly with only a minor decrease in quality. Some devices also have built-in hardware support for video encoding, which is generally much faster than software encoding. On such devices, the hardware-based encoding could be used to perform the fast encode. In either case, the bit rate of the slice would be reduced from a very high bit rate (perhaps hundreds of megabits per second, which may be too high to feasibly transmit, to something much lower (perhaps a few megabits per second). The encoder 316 can then download the slice from the remote server and encodes the slice in to the different quality levels. The selected bit rate used during slicing may be high enough to preserve as much detail as possible (since this encoded form may be used as the source for the final encode to the various quality levels), but low enough to make it feasible to deliver the slices to the remote server or directly to the encoding resources.

This technique has the advantage of eliminating overlap between slices and controlling the bit rate of the decoupled slicer 306's output, but has the disadvantage of requiring more computational power at the point of slicing since a decode and an encode are performed. There is also some loss of quality due to the intermediate decode and re-encode. Still, because the bulk of the encoding work happens by the remote encoders 316, this embodiment may still be better than current solutions that leave signal acquisition and encoding tightly coupled.

Simulated Source Slices

Similar to the embodiment of overlapping source slices, this embodiment involves reading the source media without decoding it, and making a note of where independent key frames occur. Instead of creating individual source slice files, however, the source content file is delivered in its entirety to a remote server. The slice information about where slices should occur in the source content file is transported to the encoder 316, for example, the slice information may be transported out-of-band to the encoder 316. The encoder 316 downloads a portion of the source content file from the intermediate server and then processes that portion exactly as outlined in the first technique of overlapping source slice files described above. Using the original example, the decoupled slicer 306 would note the file offsets in the source content file that correspond to the 9.7-20.2 time range, and deliver that information to the encoder 316. The encoder 316 may send a partial file download request to the intermediate server (e.g. an HTTP range request) and end up with the same source slice that would have been created with the first technique described above.

This approach eliminates the bandwidth waste of the first technique and the extra computational power required by the second technique. In addition to being more complex than the other techniques in general, it is specifically more complex in the case of live encoding. The source media may be captured to a very large file on the intermediate server, or broken up into some smaller units, such as a file that covers several minutes or hours of encoding time. Encoders 316 may have added complexity to deal with extracting source slices that cross these file boundaries.

Figure 4:
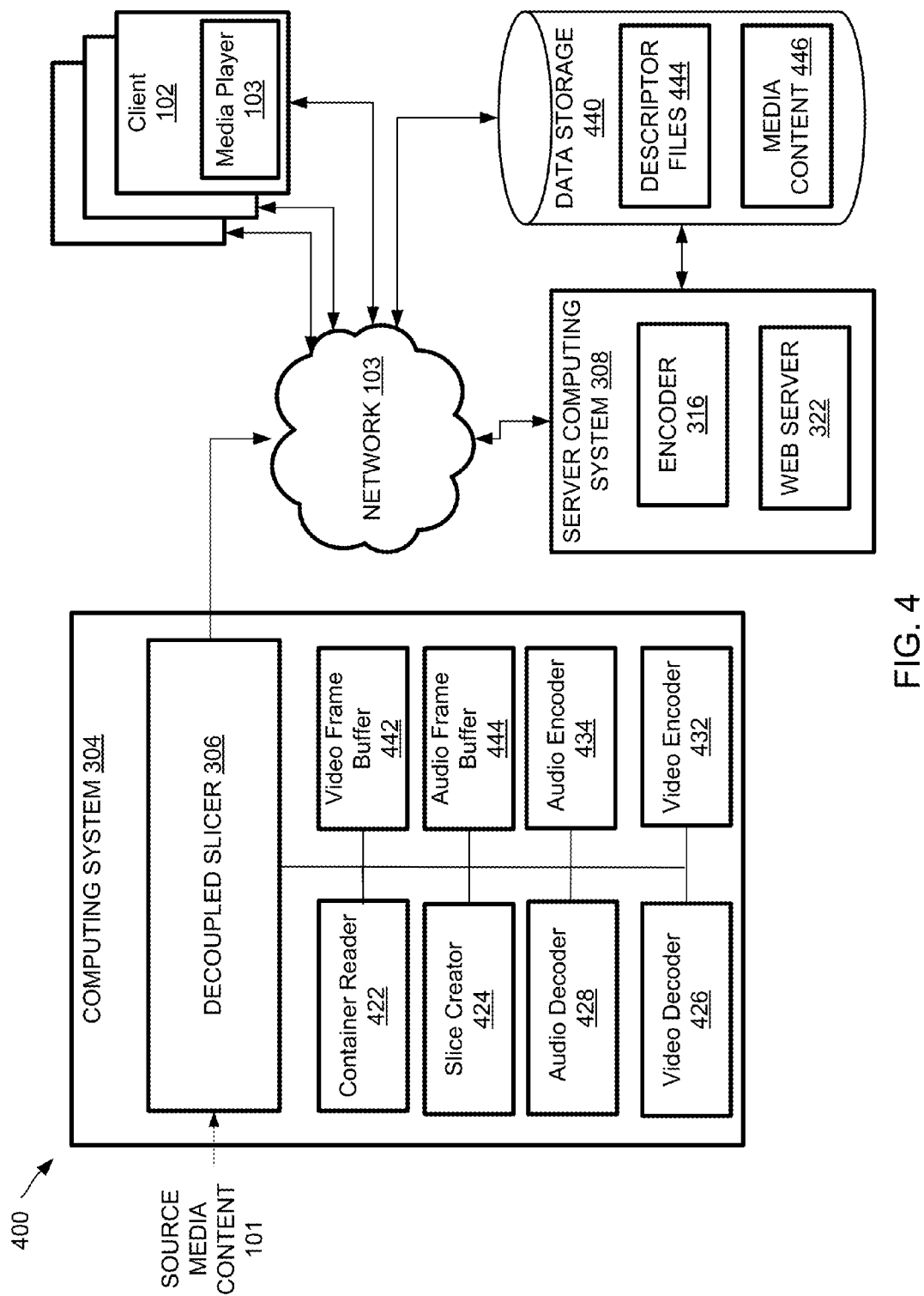
FIG. 4 is a block diagram of exemplary network architecture in which embodiments of a decoupled slicer may operate.

FIG. 4 is a block diagram of exemplary network architecture 400 in which embodiments of a decoupled slicer 306 may operate. The network architecture 400 may include multiple client computing systems 102, a server computing system 308, and a computing system 304, each coupled via a data communications network 103 (e.g., public network such as the Internet or private network such as a local area network (LAN)). In one embodiment, the server computing system 308 is a content server that receives requests for media over the network 103 from media players 103 executing on the client computing systems 102. The server computing system 308 and the client 102 may be coupled by the network 103. The network 103 may include the Internet and network connections to the Internet. Alternatively, the computing system 304, the server computing system 308, and the client computing systems 102 may be located on a common Local Area Network (LAN), Personal area network (PAN), Campus Area Network (CAN), Metropolitan area network (MAN), Wide area network (WAN), wireless local area network, cellular network, virtual local area network, or the like. The client 102 may be a client workstation, a server, a computer, a portable electronic device, an entertainment system configured to communicate over a network, such as a set-top box, a digital receiver, a digital television, a mobile phone, or other electronic devices. For example, portable electronic devices may include, but are not limited to, cellular phones, portable gaming systems, portable computing devices, or the like. The client 102 may have access to the Internet via a firewall, a router, or other packet switching devices. The server computing system 308 may be a network appliance, a gateway, a personal computer, a desktop computer, a workstation, etc. The server computing system 308 and the computing system 304 may be coupled by the network 103. The computing system 304 may be a client workstation, a server, a computer, a portable electronic device, an entertainment system configured to communicate over a network, such as a set-top box, a digital receiver, a digital television, a mobile phone, or other electronic devices. Like the client 102, the computing system 304 may include, but are not limited to, cellular phones, portable gaming systems, portable computing devices, desktop computer, workstation, or the like. The computing system 304 may have access to the Internet via a firewall, a router, or other packet switching devices.

In the depicted embodiment, the computing system 304 executes the decoupled slicer 306, which is configured to orchestrate the slicing of the source media content at a first location for subsequent encoding by the encoder 316 at a separate, second location. The server computing system 308 may execute the encoder 316, which is configured to encode the slices generated by the decoupled slicer 306, and a web server 322, which is configured to stream the encoded slices to the requesting media players 103 on the clients 102. Alternatively, the functionality of the encoder 316 and web server 322 can be distributed over two or more machines. For example, in one embodiment, the server computing system 308 may host the encoder 316 and not the web server 322, and another server computing system (not illustrated) can host the web server 322 to handle requests for the encoded media content. Alternatively, other configurations are possible as would be appreciated by one of ordinary skill in the art having the benefit of this disclosure.

In one embodiment, the network architecture 400 also includes one or more content repositories, illustrated as a data storage device 440. The data storage device 440 may be a content repository in which media content 446 may be stored. The media content 446 may be the sliced media content (temporal slices), the encoded media content, encoded slices, transport files, or any combination thereof. The data storage device 440 may also store descriptor files 444, slicing information, indexes, or other information as described herein. In one embodiment, the server computing system 308 delivers the encoded media content to the client 102, which is configured to play the content on a media player 103 that is operating on the client 102. The server computing system 308 delivers the encoded media content by streaming the encoded media content to the client 102. In a further embodiment, the client 102 is configured to receive different portions of the encoded media content from multiple locations. The portions may have an equal duration, or alternatively, the portions may have equal file sizes, or vary one to another according to other requirements. During operation, as describe in more detail below, each portion of the sliced media content 446 may be retrieved, decoded, and re-encoded into an encoded representation of that portion of the source media content at the specified quality level. Typically, in adaptive streaming, a media content file can be encoded into multiple encoded representations according to different quality profiles and stored as separate files that are independently requestable via the web server 322.

In other embodiments, media content 446 (sliced, encoded, or both) from the server computing system 308 may be replicated to other locations and served to the clients 102 using other web servers 322 located on other server computing systems. Alternatively, proxy cache servers can be used. For example, the client 102 may request and receive content from any of the multiple web servers 322, or proxy cache servers. In a further embodiment, the media content 446 may be forwarded directly to the other web servers 322 or proxy cache servers through direct communication channels without the need to traverse the Internet. In another embodiment, the web servers 322, proxy cache servers, and server computing system 308 may be organized in a hierarchy of a CDN to deliver the encoded media content to the client 102. A CDN is a system of computers networked together across the Internet that cooperates transparently to deliver content. In this embodiment, the server computing system 308 is the origin content server. The CDN may also include interconnected computer networks or nodes to deliver the encoded media content.

In one embodiment, the publisher stores the source content files in the data storage 440, and the decoupled slicer 306 can access the source content files to create indexes of the source content files and can generate slices of the source content file. In one embodiment, the decoupled slicer 306 generates the descriptor file 444 and the slices for a source content file and stores the slices and the descriptor file 444 in the data storage 440. The encoders 316 can use the descriptor file 444 to encode the slices according to the encoding profiles and store the encoded slices as the encoded media content 446 in data storage 440 to be served by the web server 322 to the media players 103. The source content file may include data corresponding to video and/or audio corresponding to a television broadcast, sporting event, movie, music, concert, or the like. The source content file may include uncompressed video and audio, or alternatively, uncompressed video or audio. Alternatively, the source content file may include compressed content (e.g., video and/or audio) using standard or proprietary encoding schemes. The source content file from the publisher may be digital in form and may include media content having a high bit rate, such as, for example, 2 Mbps or greater.

In the depicted embodiment, the decoupled slicer 306 can create metadata descriptor files 444 of the source media content 101. The metadata descriptor files 444 can be fetched or pushed to the media player 103. In one embodiment, the metadata descriptor file 444 is M3U file. A M3U file is a computer file format that stores multimedia playlists. Typically, a M3U file is a plain text file that specifies the locations one or more media files. Each line carriers on specification, which can be an absolute local pathname, a local pathname relative to the M3U file location, or a URL (both absolute and relative URLs). The M3U file can also include comments, which are prefaced by the '#' character. In extended M3U, the "™" character may also introduce extended directives. The Unicode version of M3U is M3U8, which uses UTF-8 Unicode characters. The metadata descriptor file 444 gives an overview of the content and is initially requested by the media player 103 in order to know how to request specific files or data ranges within a file. It should be noted that the web server 322 sends transport stream files in response to the requests, however, the encoded media content 446 may be stored in one or multiple files. Regardless of how the encoded media content 446 is stored, the web server 322 sends the transport stream files with the corresponding slice of media content requested. When the encoded media content is stored as discrete files, the web server 322 may send the discrete file (encoded according to the appropriate quality profile) as the transport stream file in response to the request. However, when the encoded media content 446 is stored a single file, an identifier and an offset may be used to retrieve the appropriate slice of the source content file (encoded according to the appropriate quality profile), and the web server 322 can send this slice as a transport stream file in response to the request.

In one embodiment, the M3U8 file is created with the available quality profiles and where the encoded media content at those profiles are located. The media player 103 reads the descriptor file 444 for the encoded media content that is being requested. The metadata descriptor file 444 may also include a unique content identifier (UCID), duration of the encoded media content, available quality profiles, and locations of where the encoded media content can be retrieved. The quality profiles may specify parameters, such as width and height of the image (i.e., image size), video bit rate (i.e., rate at which the video is encoded), audio bit rate, audio sample rate (i.e., rate at which the audio is sampled when captured), number of audio tracks (e.g., mono, stereo, or the like), frame rate (e.g., frame per second), staging size, or the like. For example, the media players 103 may individually request different quality levels of the same media content; for example, each media player 103 may request the same portion (e.g., same time index) of the encoded media content but at different quality levels. For example, one media player may request a slice having HD quality video, since the computing device of the requesting media player has sufficient computational power and sufficient network bandwidth, while another media player may request a slice having a lower quality, since its computing device may not have sufficient network bandwidth, for example. In one embodiment, the media player 103 shifts between quality levels at the slice boundaries by requesting slices from different copies (e.g., different quality streams) of the source media content. Alternatively, the media player 103 can request the slices using other techniques that would be appreciated by those of ordinary skill in the art having the benefit of this disclosure. The metadata descriptor file 444 may also include other metadata, including, for example, air date of the content, title, actresses, actors, a start index, an end index, proprietary publisher data, encryption level, content duration, episode or program name, publisher; available tools for the end-user navigational environment, such as available menus, thumbnails, sidebars, advertising, fast-forward, rewind, pause, and play, or the like; or bit-rate values, including frame size, audio channel information, codecs, sample rate, and frame parser information. In one embodiment, a content management system (CMS) publishing system may be used to create the metadata descriptor files 444, and the decoupled slicer 306 is used to create slice information about the temporal slices of the source media content 101 for encoding as described herein.

In other embodiments, the computing environment 400 may include other devices, such as directory servers, Digital Rights Management (DRM) servers, statistic servers, devices of a network infrastructure operator (e.g., an ISP), or the like.

Referring back to FIG. 4, the decoupled slicer 306 is configured to interact with a container reader 422, a slice creator 424, a video decoder 426, an audio decoder 428, a video encoder 432, an audio encoder 434, a video frame buffer 442, and an audio frame buffer 444. The operations of the decoupled slicer 306 and these components are described in detail with respect to FIG. 5.

Typically, when slicing media content for adaptive streaming, an encoder has to process the whole file sequentially in which the encoder reads enough data to create a slice of a fixed duration of the source media content, and then it encodes the slice at the appropriate quality profile. The encoder then reads in additional data to have enough to create the next slice, and encode the second slice at the appropriate quality profile. This is repeated until the whole file is encoded. In the embodiments described herein, the decoupled slicer 306 can process the source media content 101 and create slices that can be transported to be subsequently encoded by encoders located at a different location. For example, instead of slicing and encoding and then uploading multiple copies of the source media content, the decoupled slicer 306 slices the source media content and uploads the slices to a data center at which the slices can be encoded using the resources at the data center. In another embodiment, the decoupled slicer 306 creates slice information so that the encoders can request portions of the source content file that would be the same as the slices created by the decoupled slicer 306. Conventionally when encoding, the decoder can start at the beginning of an original mezzanine file and provide audio and video samples into audio and video buffers. When there is enough data in the buffers equal to a slice, this data can be pushed out of the buffers to be encoded into an encoded slice. The following description indicates how the embodiments described herein can create a record (e.g., an index) of the source media content, generate slices of the source media content (or slice information), and send the slices over at network to a remote server at a second location, the remote server to encode the slices. The encoding of the slices is decoupled from the slicing of the source media content.

Figure 5:
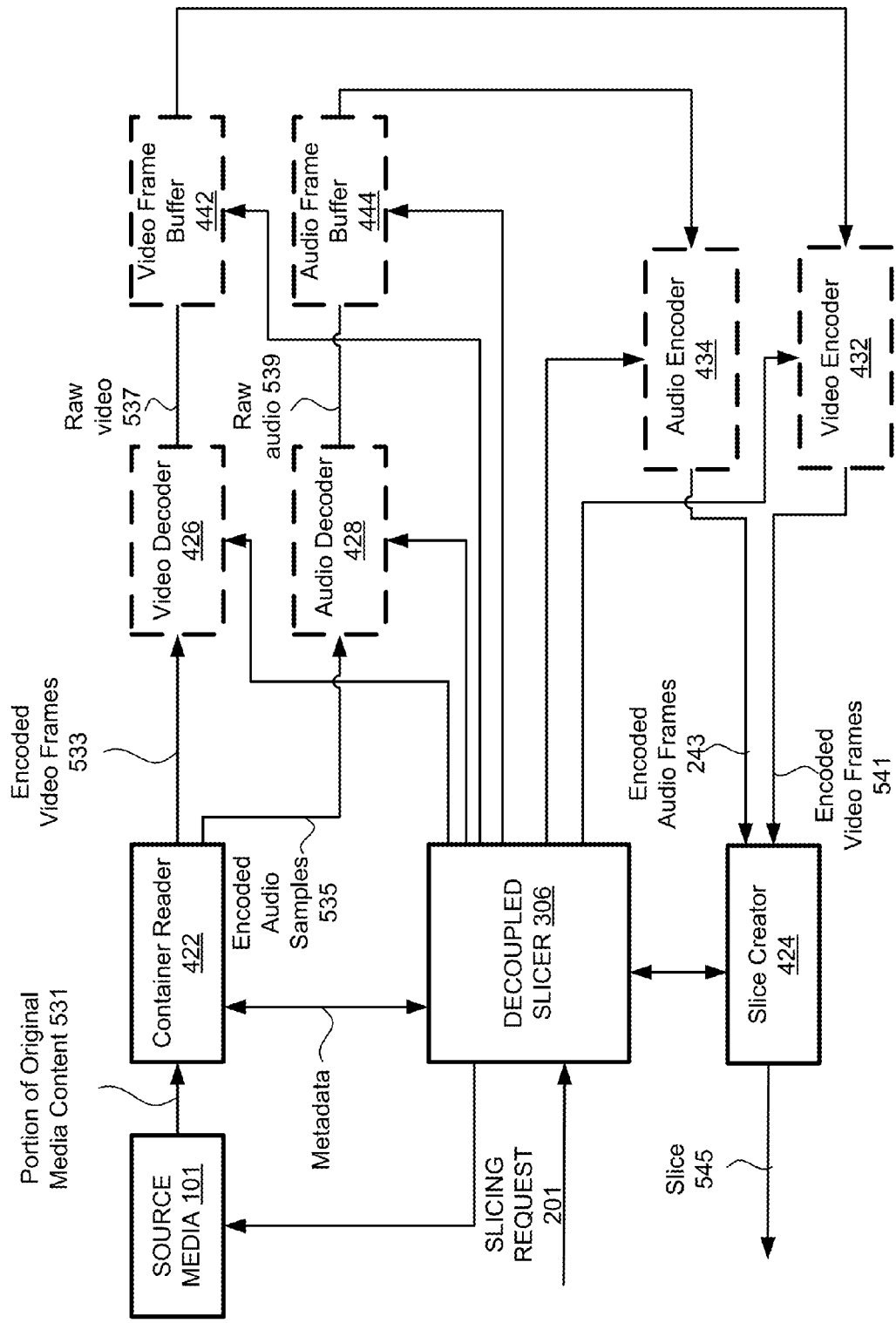
FIG. 5 is a diagram that illustrates a flow of operation of the decoupled slicer to slice a portion of media content according to one embodiment.

FIG. 5 is a diagram that illustrates a flow of operation of the decoupled slicer to slice a portion of media content according to one embodiment. In one embodiment, when source media content 101 (file or signal) is added to a content library, the decoupled slicer 306 can process the source media content. For example, the source media content may be an MP4 file, where the MP4 file is the container that stores metadata and the actual audio and video samples. The actual audio and video samples have been encoded using a codec, such as AAC, H264, or the like. Using the container reader 422, the decoupled slicer 306 can read the metadata information from the container. Reading metadata information from the container is not a computationally intensive operation as compared to decoding the audio and video samples. Using the container reader 422, the decoupled slicer 306 can scan the source media content, looking for all the video key frames. The decoupled slicer 306 creates an index of the source media content, and the video key frames can become index points. For example, this index can be created when adding the source media content to the content library.

The key frames have a corresponding time stamp and the decoupled slicer 306 can use the time stamps of the key frames to determine the relation between the key frames. For example, if there is a key frame at 15 seconds into the source media content and the second key frame is at 33 seconds. The decoupled slicer 306 can create a slice with a key frame in between the two key frames in the source media content. In essence, the decoupled slicer 306 can create key frames at specified boundaries. For example, the key frame boundaries can be created to allow for adaptive streaming between different quality levels, the different quality levels being created from the same corresponding slice. The key frame boundaries could be a fixed-time durations. Also, the key frame boundaries can be created at non-fixed time durations, but, when encoded by the encoders, the key frame boundaries between different quality levels can be aligned to allow for smooth transitions between quality levels. Alternatively, the decoupled slicer 306 can slice the video according to the key frames in the source media content 101. In cases where the decoupled slicer 306 generates an index of source media content but does not create slices at the slicer 306, the decoupled slicer 360 can instruct the video decoder 426 and audio decoder 428 to not decode the encoded video frames 533 and encoded audio samples 535.

In some cases, the source media content 101 is encoded and needs to be decoded and re-encoded to create a slice containing the encoded media content at the appropriate time range. The decoupled slicer 306, using the video decoder 426 and audio decoder 428, decodes the encoded video frames 233 and the encoded audio samples 235 to generate the raw video 237 and the raw audio 239, respectively. These samples are stored in the video frame buffer 442 and audio frame buffer 444. The decoupled slicer 306 can discard the samples that are outside the requested time range. The decoupled slicer 306, using the video encoder 432, encodes the raw video 237 (for the requested time range) into encoded video frames 241, and, using the audio encoder 434, encodes the raw audio 239 (for the requested time range) into encoded audio frames 243. The decoupled slicer 306 can instruct the video encoder 432 and the audio encoder 434 of the quality profile to be used for encoding the audio and video. The decoupled slicer 306, using the slice creator 424, creates a slice 245 having the encoded video frames 241 and the encoded audio frames 243 for the requested time range, and sends the slice 245.

In one embodiment, a new key frame may be created at the identified time index, even if the sample at that time was not a key frame previously. Continuing the example from above, the decoupled slicer 306, using the slice creator 424, may create a slice of 20-25 seconds with a key frame at 20 seconds. In another embodiment, the decoupled slicer 306 may create a slice between 15-25 seconds and the key frame at 15 seconds is still used. However, this may introduce additional delay to decode and play the slice at the media player 103. In this embodiment, the media player 103 may be instructed to decode the samples, but only render the decoded audio and video for the requested time range. Either way, the slice 245 has encoder to independently decode the slice 245 for re-encoding the raw video and raw audio of the slice 245 at multiple quality levels.

In one embodiment, when doing the preprocessing of the source media content, the decoupled slicer 306 can read the encoded media content 446, using the container reader 422 without actually decoding the encoded video frames 233 and the encoded audio samples. In effect, the container reader 422 can read a container (sometimes called a wrapper) to obtain metadata information, and can read the pass the video and audio samples to the decoder, but instruct the decoder not to decode, for example, to determine which video frames are key frames without using the computational resources to decode the actual video frames. Alternatively, the encoded video frames 233 and audio samples 235 can be discarded before being sent to the decoders. In one embodiment, there is a container and the container has the audio samples and the video frames that are encoded. The container can be opened and read without using computational resources to decode the audio samples and video frames, especially, since this pre-processing does not require decoded the video frames to obtain the actual pixel data or the audio samples. These frames and samples can be discarded before the decoders decode the video samples or audio samples, or the decoders can be instructed not to decode in order to quickly process the encoded media content. In one embodiment, the pre-processing may be done by a pipeline processing architecture as illustrated in FIG. 5 in which the decoupled slicer 306 orchestrates the pre-processing. In one exemplary embodiment, the decoupled slicer 306 fetches a file (or portion of a file) that has the encoded media content 446. The container reader 422 reads the container, such as the AVI container or MP4 container (or other types of containers, such as MP3, MKV, or the like). The container reader 422 outputs the encoded video frames 233 and the encoded audio samples 235, as well as any other metadata information in the container. For example, an MP4 container may indicate that there are 2 media tracks in this file, one being video the other audio, that the video is H264 encoded, and the audio is AAC in stereo. When the container reader 422 outputs the frames and samples, the decoupled slicer 306 can determine the track of the frame or sample, whether it is audio or video. The video frames being output may also include a flag that indicates that it is a key frame. The decoupled slicer 306 can identify the type and duration of the samples and frames. For example, the decoupled slicer 306 can determine that a video frame has a presentation time of 20.2 seconds from the beginning and it is a key frame and that the corresponding audio has 1024 audio samples. Although the actual data has not been accessed yet, the output of the container reader 422 splits into two different pipelines, one pipeline for the audio codec (audio decoder 428), and the other for the video codec (video decoder 426).

The decoders, when instructed to decode, output the raw video frame 237 and the raw audio samples 239 into the video frame buffer 442 and the audio frame buffer 444, respectively. Thus, the decoupled slicer 306 can instruct the decoders to not encode the video frames 233 and the audio samples 235 when performing the pre-processing. However, in other embodiments when the decoupled slicer 306 decodes and re-encodes slices (e.g., for creating fast encoded slices), the decoupled slicer 306 can instruct the decoders to encode the video frames 233 and the audio samples 235. In another embodiment, the decoupled slicer 306 may be configured to not send the video frames and audio samples to the decoders when performing the pre-processing. In another embodiment, the decoupled slicer 306 may be configured to instruct the decoders to discard the video frames and audio samples. Alternatively, the decoupled slicer 306 can use a series of commands to turn the decoders on and off. When the decoders are off the video frames and audio frames may be passed through without being decoded and then subsequently discarded.

In one embodiment, the decoupled slicer 306 may record a presentation for all key frames and the location of the key frame within the actual file. This is done to build the index of these points that can be jumped to in order to start reading the data when decoding and encoding the data into the slice 245.

In another embodiment, when the preprocessing is done in connection with the request, the decoupled slicer 306 can read the encoded media content 446 to determine the index points for the key frames. When the decoupled slicer 306 reaches or is approaching the desired starting point, it can start to decoding the key frame and may discard everything until then. This way, the decoupled slicer 306 does not use a lot of computational resources decoding all frames up to the requested time, but can start decoding the key frame and subsequent frames that are needed to decode the first frame of the requested time range. These decoded frames can be stored in the video frame buffer 442. In another embodiment, the decoupled slicer 306 can discard everything until it has identified the specific key frame needed to decode the first frame of the requested time range, and then go back and start decoding from the key frame up through the requested time range. The video and audio stored in the buffers can then be used to create a slice for the requested time range. In particular, the decoupled slicer 306 can instruct the audio encoder 434 and video encoder 432 to encode the raw data into encoded audio frames and video frames for the slice 245. The decoupled slicer 306 can instruct the slice creator 424 to create the slice with the necessary encoded audio frames and video frames.

In another embodiment, when the first frame of the requested time range is not a key frame, the decoupled slicer 306 can decode the frame as described above (decoding from the previous key frame and any intervening delta frames), and then encode this first frame as a key frame. The subsequent frames to this first frame may be able to be copied from the original data so that the decoupled slicer 306 does not have to re-encode the subsequent delta frames after the newly created key frame. This may speed up the operation, and may not lose any quality by re-encoding the video frames. Alternatively, the decoupled slicer 306 can re-encode all video frames again as would be appreciated by one of ordinary skill in the art having the benefit of this disclosure.

Described herein are methods and systems for decoding descriptive information from a container without decoding or preventing the decoding of the actual video data within the container. In some embodiments, the decoupled slicer 306 may create an index so that frames that are not independently decodable (delta frames) can be decoded and encoded as a key frame that is independently decodable. The subsequent delta frames may be encoded again or may be copied from the original data.

Although the embodiments of FIG. 5 describe using the video decoder 426, audio decoder 428, video frame buffer 442, audio frame buffer 444, audio encoder 434, and video encoder 432, the decoupled slicer 306 can determine that the source media content does not need to be decoded, such as when receiving a signal as the source. In these embodiments, the decoupled slicer 306 inspects the source media content to locate key frames and audio boundaries without decoding the source media content. The decoupled slicer 306 determines whether slices are to be created or not. If so, the decoupled slicer 306 slices the source media content into temporal slices of media content, such as slice files, with audio and video in the time range plus sufficient data before and after, and sends the slices to a remote server. If the slices are not to be created, the decoupled slicer 306 creates a descriptive file indicating key frames and audio boundaries and sends the source content file to a remote server along and sends the descriptive files to the remote server. The remote server using the slices or the source content file and descriptive file encodes the source media content into multiple quality levels.

Figure 6:
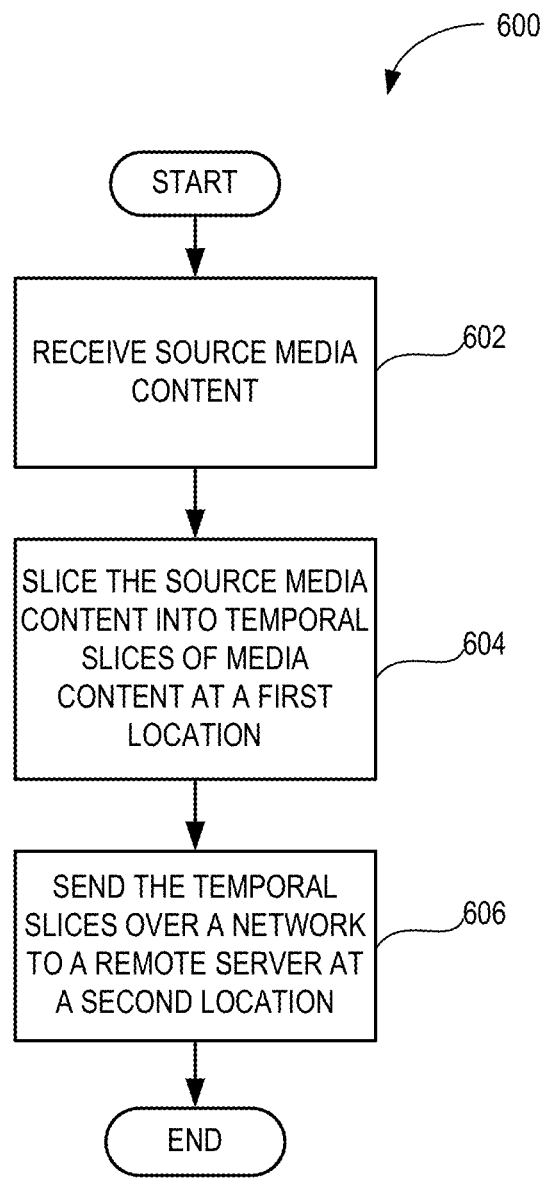
FIG. 6 is a flow diagram of one embodiment of a method of slicing source media content decoupled from encoding the source media content.

FIG. 6 is a flow diagram of one embodiment of a method 600 of slicing media content decoupled from encoding the encoded media content. The method 600 is performed by processing logic that may comprise hardware (circuitry, dedicated logic, etc.), software (such as is run on a general purpose computing system or a dedicated machine), firmware (embedded software), or any combination thereof. In one embodiment, the decoupled slicer 306 of FIG. 3 performs the method 600. Alternatively, other components of the computing system 304, the server computing system 308, or both can perform some or all of the operations of method 600.

Referring to FIG. 6, processing logic begins with receiving source media content at a first location (block 602). The processing logic slices the source media content into temporal slices of media content at the first location (block 604), and sends the temporal slices over a network to a remote server at a second location (block 606), and the method 600 ends. The temporal slices are to be encoded at multiple quality levels (e.g., multiple bitrates) at the second location, for example, for delivery by a web server to one or more client computing systems. In one embodiment, the client computing systems requests particular slices at different quality levels for adaptive streaming as described herein. Unlike traditional slicing and encoding, in the embodiments described herein, the encoding of the temporal slices is decoupled from the slicing of the source media content. The remote server can be located at a data center for the second location and the first location can be an event site, a publisher's facility, or the like. The first location could also be a location of a portable device in which the processing device performs the method 600.

In another embodiment, a set of one or more encoders located at the second location encode the temporal slices at the multiple quality levels. In a further embodiment, a web server, which can be at the second location or a third location, delivers one or more of the encoded slices at one or more of the quality levels to a media player executing on a client computing system in response to one or more requests by the media player, such as done in some adaptive streaming techniques. Alternatively, the web server can stream the encoded slices according to other streaming techniques as would be appreciated by one of ordinary skill in the art having the benefit of this disclosure.

In one embodiment, the processing logic slices the source media content into overlapping source slices. In one embodiment, the processing logic creates the overlapping source slices by reading the source media content without decoding the source media content and creating a record of key frames of video and of audio block boundaries of audio in the source media content. The processing logic, for each specified temporal range, creates a slice file that includes audio and video (or one or the other depending on the type of media content) in the specified temporal range. The slice file also includes additional data so that the audio and video in the specified temporal range is independently decodable by an encoder at the second location. The processing logic then sends the slice file over the network to the remote server. In one embodiment, the additional data includes at least one of audio or video before the specified temporal range. In another embodiment, the additional data includes at least one of audio or video after the specified temporal range. In another embodiment, the additional data includes at least one of audio or video before and after the specified temporal range. In another embodiment, the additional data includes a key frame of media content and any intervening delta frames before a start of the specified temporal range.

In one embodiment, the source media content is stored in a file that includes a container, like an MP4 container or the like, which includes metadata and encoded video/audio date like H.264 data. The processing logic reads the source media content by inspecting the container to read the metadata without decoding the encoded video/audio data.

In one embodiment, a set of one or more encoders at the second location decode the slice file to raw audio and raw video (or one or the other as described herein), and encodes the raw audio and raw video within the specified temporal range at multiple quality levels. In one embodiment, the set of encoders discard the raw audio and raw video outside the specified temporal range. In one embodiment, the processing logic encodes slice information into the slice file to indicate the raw audio and raw video to be encoded and the raw audio and raw video to be discarded.

In another embodiment, the processing logic slices the source media content by creating encoded source slices. In one embodiment, the processing logic creates the encoded source slices by reading the source media content and decoding the source media content into raw audio and raw video. For each specified temporal range, the processing logic creates a slice file that includes the audio and video in the specified temporal range and re-encodes the slice file. The processing logic sends the slice file over the network to the remote server.

In another embodiment, the processing logic slices the source media content by creating simulated source slices. In one embodiment, the processing logic creates the simulated source slices by reading the source media content without decoding the source media content. The processing logic creates a record of key frames of video and of audio block boundaries of audio in the source media content and generates slice information about where the temporal slices should occur in the source media content using the record. The processing logic sends a source content file containing the source media content over the network to the remote server and sends the slice information about the temporal slices to the remote server. The slice information may be the same information that is encoded in the slice files described above, but in this case, the slices are not created at the first location. In one embodiment, the processing logic sends the slice information out-of-band from sending the source content file. In one embodiment, an encoder at the second location can request a portion of the source content file using the slice information, and decodes the portion to raw audio and raw video. The encoder encodes the raw audio and raw video within the specified temporal range at the multiple quality levels and discards the raw audio and raw video outside the specified temporal range. In one embodiment, the encoder requests the portion by generating a range request using the slice information, for example, an HTTP range request.

Figure 7:
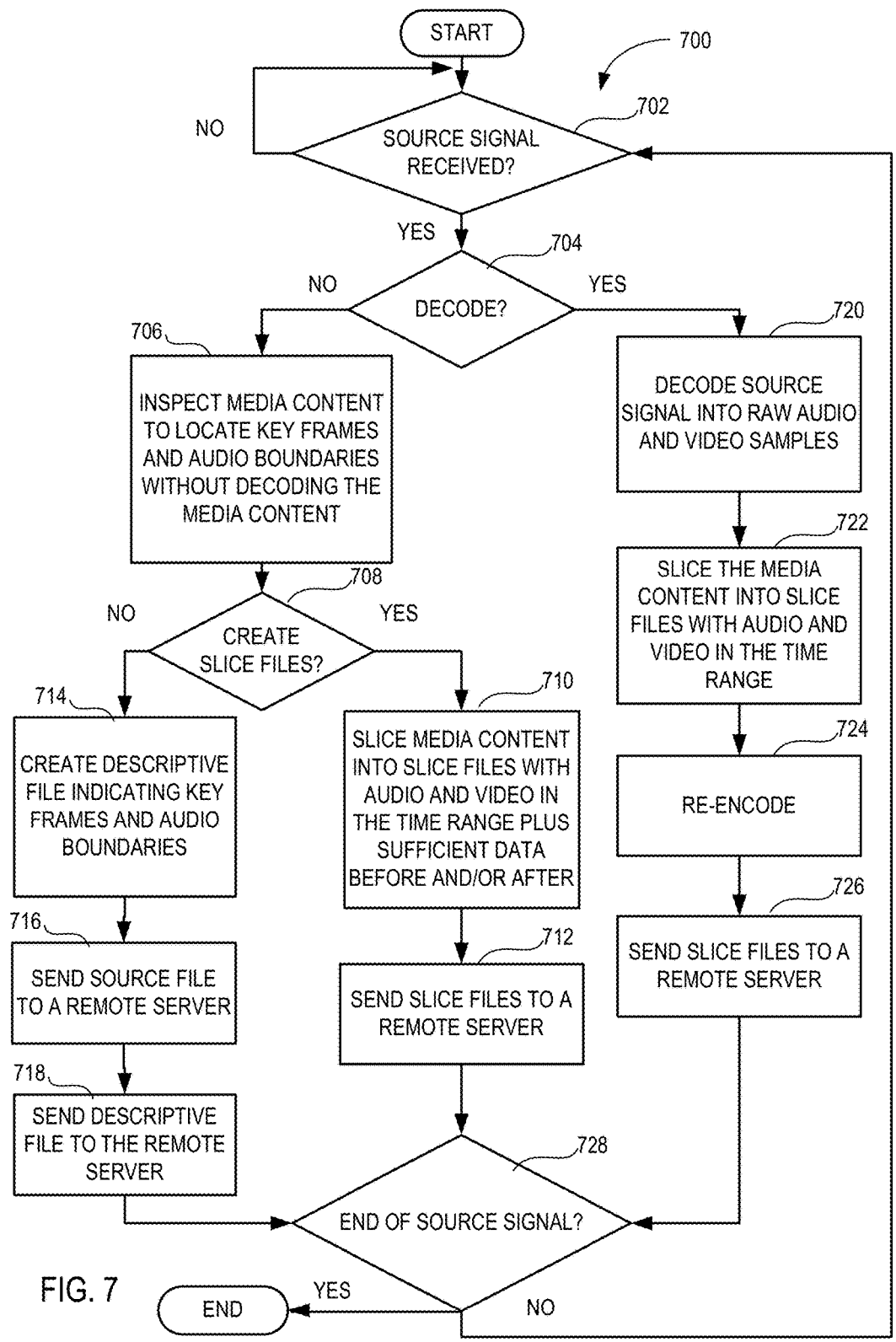
FIG. 7 is a flow diagram of another embodiment of a method of slicing source media content decoupled from encoding the source media content for adaptive streaming.

FIG. 7 is a flow diagram of another embodiment of a method 700 of slicing media content decoupled from encoding the source media content for adaptive streaming. The method 700 is performed by processing logic that may comprise hardware (circuitry, dedicated logic, etc.), software (such as is run on a general purpose computing system or a dedicated machine), firmware (embedded software), or any combination thereof. In one embodiment, the decoupled slicer 306 of FIG. 3 performs the method 700. Alternatively, other components of the computing system 304, the server computing system 308, or both can perform some or all of the operations of method 700.

Referring to FIG. 7, processing logic begins with determining whether source media content (source content file or source content feed) is received (block 702). If not, the processing logic continues to wait until source media content is received at block 702. If the source media content is received, the processing logic determines if the source media content is to be decoded or not (block 704). If not, the processing logic inspects the source media content of the source media content to locate key frames and audio boundaries without decoding the source media content (block 706). The processing logic determines if slice files are to be created (block 708). If so, the processing logic slices the source media content into slice files with audio and video in the time frame plus sufficient data before and/or after the time range (block 710). The processing logic then sends the slice files to the remote server (block 712). This describes the first technique described above. If the processing logic determines not to create slice files at block 708, the processing logic creates a descriptive file indicating the location of the key frames and the audio boundaries (block 714), and sends the source content file in its entirety and the descriptive file to the remote server (blocks 716 and 718). This describes the third technique described above.

If the processing logic determines to decode the source media content earlier at block 704, the processing logic decodes the source media content into raw audio and video samples (block 720), and slices the source media content into slice files with audio and video in the time range (block 722). The processing logic re-encodes the slice files for transport (block 724), and sends the slice files to a remote server (block 726). This describes the second technique described above.

Regardless of the technique used above, the processing logic determines if the end of the source media content is received to determine whether to continue slicing the source media content (block 728). If no end-of-signal is received at block 728, the processing logic continues slicing the source media content, returning to block 702 to repeat the operations described above until the end-of-signal is received.

Figure 8:
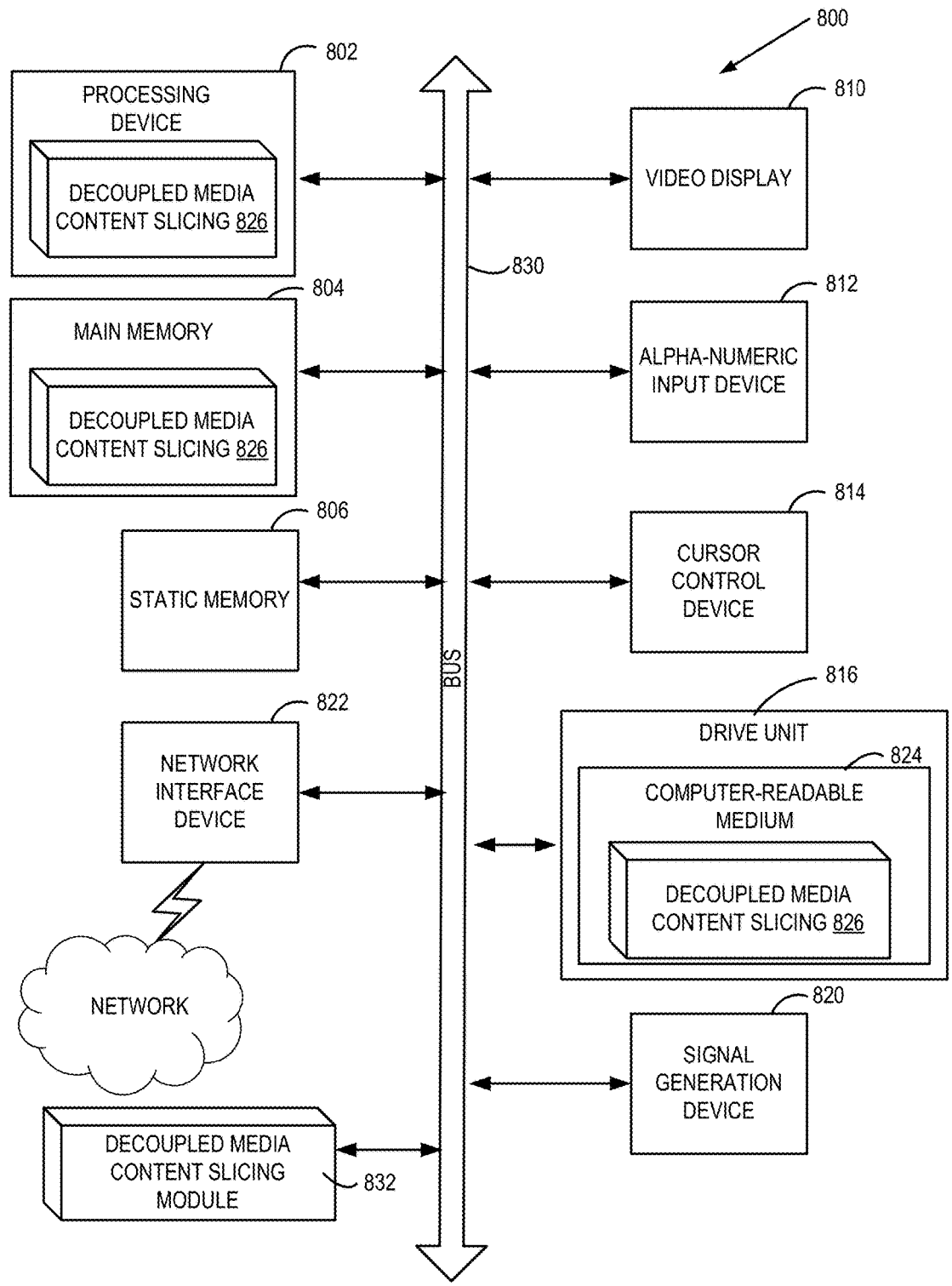
FIG. 8 illustrates a diagrammatic representation of a machine in the exemplary form of a computing system for decoupled media content slicing.

FIG. 8 illustrates a diagrammatic representation of a machine in the exemplary form of a computing system 800 for decoupled media content slicing. Within the computing system 800 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for decoupled media content slicing, such as the method 700 described above. In one embodiment, the computing system 800 represents various components that may be implemented in the terminal 102 as described above. Alternatively, the terminal 102 may include more or less components as illustrated in the computing system 800.

The exemplary computing system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, each of which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic (e.g., decoupled media content slicing 826) for performing the operations and steps discussed herein.

The computing system 800 may further include a network interface device 822. The computing system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-readable storage medium 824 on which is stored one or more sets of instructions (e.g., decoupled media content slicing 826) embodying any one or more of the methodologies or functions described herein. The decoupled media content slicing 826 may also reside, completely or at least partially, within the main memory 804 and/or within the processing device 802 during execution thereof by the computing system 800, the main memory 804, and the processing device 802 constituting computer-readable storage media. The decoupled media content slicing 826 may further be transmitted or received over a network via the network interface device 822.

While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The decoupled media content slicing module 832, components, and other features described herein (for example in relation to FIG. 3) can be implemented as discrete hardware components or integrated in the functionality of hardware components such as ASICS, FPGAs, DSPs, or similar devices. The decoupled media content slicing module 832 may implement operations of decoupled media content slicing as described herein with respect to FIG. 4. In addition, the decoupled media content slicing module 832 can be implemented as firmware or functional circuitry within hardware devices. Further, the decoupled media content slicing module 832 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method, implemented by a computing system programmed to perform the following, comprising:
   receiving source media content at the computing system;
   slicing the source media content into temporal slices of media content at a first location by the computing system, wherein the slicing comprises creating overlapping temporal slices by:
      reading the source media content without decoding the source media content;
      creating a record of key frames of video and of audio block boundaries of audio in the source media content, wherein the key frames of the video and of the audio block boundaries define a plurality of temporal ranges; and
      for each temporal range of the plurality of temporal ranges, creating a slice file that comprises audio and video in the temporal range and additional audio and additional video before and after the temporal range such that the audio and video in the temporal range is independently decodable by an encoder, wherein the additional video is discarded after decoding; and
   sending each slice file, with an overlapping temporal slice, over a network to a remote server at a second location at which each temporal slice, corresponding to the overlapping temporal slice, is to be encoded at a plurality of quality levels to create multiple copies of each of the temporal slices, wherein each of at least some of the multiple copies is encoded at a different one of the plurality of quality levels, wherein the encoding of the temporal slices is decoupled from the slicing of the source media content.

2. The method of claim 1, further comprising encoding the temporal slices at the plurality of quality levels by a set of one or more encoders located at the second location, to generate one or more of encoded slices.

3. The method of claim 2, further comprising delivering, by a server at the second location, one or more of the encoded slices at one or more of the plurality of quality levels to a media player executing on a client computing system in response to one or more requests by the media player.

4. The method of claim 1, wherein the additional audio is discardable after decoding by the encoder.

5. The method of claim 1, wherein the additional audio and additional video includes data comprising a key frame of the source media content and any intervening delta frames before a start of the temporal range.

6. The method of claim 1, wherein the source media content is stored in a file comprising a container including metadata and encoded video and audio data, and wherein the reading the source media content comprises inspecting the container to read the metadata without decoding the encoded video and audio data.

7. The method of claim 1, further comprising:
   decoding the slice file to raw audio and raw video by a set of one or more encoders at the second location;
   encoding the raw audio and raw video within the temporal range at a plurality of quality levels by the set of encoders; and
   discarding the raw audio and raw video outside the temporal range.

8. The method of claim 7, further comprising encoding, by the computing system, slice information into the slice file to indicate the raw audio and raw video to be encoded and the raw audio and raw video to be discarded.

9. The method of claim 1, wherein the slicing further comprises creating encoded source slices.

10. The method of claim 9, wherein the creating the encoded source slices comprises:
    reading the source media content;
    decoding the source media content into raw audio and raw video; and
    for each temporal range, creating the slice file that comprises the audio and video in the temporal range and re-encoding the slice file, and wherein the sending the temporal slices comprises sending each slice file over the network to the remote server.

11. The method of claim 1, wherein the slicing further comprises creating simulated source slices.

12. The method of claim 11, wherein the creating the simulated source slices comprises:
    reading the source media content without decoding the source media content;
    creating the record of key frames of video and of audio block boundaries of audio in the source media content; and
    generating slice information about where the temporal slices should occur in the source media content using the record, and wherein the sending the temporal slice comprises:

sending a source content file containing the source media content over the network to the remote server; and sending the slice information about the temporal slices to the remote server.

13. The method of claim 12, wherein the sending the slice information comprises sending the slice information out-of-band from the sending the source content file.

14. The method of claim 12, further comprising:
requesting a portion of the source content file using the slice information;
decoding the portion to raw audio and raw video by a set of one or more encoders at the second location;
encoding the raw audio and raw video within a specified temporal range at a plurality of quality levels by the set of encoders; and
discarding the raw audio and raw video outside the specified temporal range.

15. The method of claim 14, wherein the requesting the portion comprises generating a range request using the slice information.

16. A non-transitory computer readable storage medium including instructions that, when executed by a server computing system, cause the server computing system to perform a method comprising:
receiving source media content at the server computing system;
slicing the source media content into temporal slices of media content at a first location by the server computing system, wherein the slicing comprises creating overlapping temporal slices by:
reading the source media content without decoding the source media content;
creating a record of key frames of video and of audio block boundaries of audio in the source media content, wherein the key frames of the video and of the audio block boundaries define a plurality of temporal ranges; and
for each temporal range of the plurality of temporal ranges, creating a slice file that comprises audio and video in the temporal range and additional audio and additional video before and after the temporal range such that the audio and video in the temporal range is independently decodable by an encoder, wherein the additional video is discarded after decoding; and
sending each slice file, with an overlapping temporal slice, over a network to a remote server at a second location at which each temporal slice, corresponding to the overlapping temporal slice, is to be encoded at a plurality of quality levels to create multiple copies of each one of the temporal slices, wherein each of at least some of the multiple copies is encoded at a different one of the plurality of quality levels, wherein the encoding of the temporal slices is decoupled from the slicing of the source media content.

17. The non-transitory computer readable storage medium of claim 16, wherein the additional audio is discarded after decoding by the encoder.

18. The non-transitory computer readable storage medium of claim 16, wherein the slicing comprises:
reading the source media content;
decoding the source media content into raw audio and raw video; and
for each temporal range, creating the slice file that comprises the audio and video in the temporal range and re-encoding the slice file, and wherein the sending the temporal slices comprises sending the slice file over the network to the remote server.

19. The non-transitory computer readable storage medium of claim 16, wherein the slicing comprises:
reading the source media content without decoding the source media content;
creating the record of key frames of video and of audio block boundaries of audio in the source media content; and
generating slice information about where the temporal slices should occur in the source media content using the record, and wherein the sending the temporal slice comprises:
sending a source content file containing the source media content over the network to the remote server; and
sending the slice information about the temporal slice to the remote server.

20. A computing system, comprising:
a network interface coupled to a network;
a data storage device; and
a processing device, coupled to the data storage device, to receive source media content, slice the source media content into temporal slices of media content at a first location, wherein to slice comprises to create overlapping temporal slices by:
reading the source media content without decoding the source media content;
creating a record of key frames of video and of audio block boundaries of audio in the source media content, wherein the key frames of the video and of the audio block boundaries define a plurality of temporal ranges; and
for each temporal range of the plurality of temporal ranges, creating a slice file that comprises audio and video in the temporal range and additional audio and additional video before and after the temporal range such that the audio and video in the temporal range is independently decodable by an encoder, wherein the additional video is discardable after decoding, and
send each slice file, with an overlapping temporal slice, over the network interface to a remote server at a second location at which each temporal slice, corresponding to the overlapping temporal slice, is to be encoded at a plurality of quality levels, to create multiple copies of each one of the temporal slices, wherein each of at least some of the multiple copies is encoded at a different one of the plurality of quality levels, wherein the encoding of the temporal slices is decoupled from the computing system slicing the source media content.

21. The computing system of claim 20, wherein the additional audio is discardable after decoding by the encoder.

22. The computing system of claim 20, wherein the additional audio and additional video includes data comprising a key frame of the source media content and any intervening delta frames before a start of the temporal range.

23. The computing system of claim 20, wherein the source media content is stored in a file comprising a container including metadata and encoded video and audio data, and wherein the reading the source media content comprises inspecting the container to read the metadata without decoding the encoded video and audio data.

24. The computing system of claim 20, wherein the processing device is further to:

decode the slice file to raw audio and raw video by a set of one or more encoders at the second location;
encode the raw audio and raw video within the temporal range at a plurality of quality levels by the set of encoders; and
discard the raw audio and raw video outside the temporal range.

\* \* \* \* \*